United States Patent
Jones et al.

(10) Patent No.: US 9,088,123 B2
(45) Date of Patent: Jul. 21, 2015

(54) TWO-LASER GENERATION OF EXTENDED UNDERWATER PLASMA

(71) Applicants: Theodore G. Jones, Alexandria, VA (US); Antonio C. Ting, Silver Spring, MD (US); Daniel F. Gordon, Waldorf, MD (US); Michael H. Helle, Arlington, VA (US); Joseph R. Peñano, Fairfax Station, VA (US)

(72) Inventors: Theodore G. Jones, Alexandria, VA (US); Antonio C. Ting, Silver Spring, MD (US); Daniel F. Gordon, Waldorf, MD (US); Michael H. Helle, Arlington, VA (US); Joseph R. Peñano, Fairfax Station, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 380 days.

(21) Appl. No.: 13/711,752

(22) Filed: Dec. 12, 2012

(65) Prior Publication Data
US 2013/0148685 A1   Jun. 13, 2013

Related U.S. Application Data

(60) Provisional application No. 61/569,818, filed on Dec. 13, 2011.

(51) Int. Cl.
| | |
|---|---|
| H01S 1/04 | (2006.01) |
| G10K 15/04 | (2006.01) |
| F41H 13/00 | (2006.01) |
| G02F 1/35 | (2006.01) |

(52) U.S. Cl.
CPC ............... *H01S 1/04* (2013.01); *F41H 13/005* (2013.01); *G02F 1/3511* (2013.01); *G10K 15/046* (2013.01)

(58) Field of Classification Search
CPC .................................. G02F 1/3511; H01S 3/20
USPC ........................................................... 367/149
See application file for complete search history.

(56) References Cited

U.S. PATENT DOCUMENTS

| 7,260,023 B2 | 8/2007 | Jones et al. |
| 8,223,590 B2 * | 7/2012 | Jones et al. .................. 367/128 |
| 2012/0114007 A1 | 5/2012 | Jones et al. |

OTHER PUBLICATIONS

Joseph R. Woodworth et. al. "Laser Triggering of Water Switches in Terrawatt-Class Pule Power Accelerators" Dec. 2005, Sandina National Laboratories.*
Y.-H. Chen, S. Varma, T. M. Antonsen, and H. M. Milchberg, "Direct Measurement of the Electron Density of Extended Femtosecond Laser Pulse-Induced Filaments," Phys. Rev. Lett. 105, 215005 (2010).

(Continued)

*Primary Examiner* — Luke Ratcliffe
(74) *Attorney, Agent, or Firm* — US Naval Research Laboratoty; Joslyn Barritt (57) ABSTRACT

A method for generating an extended underwater plasma. A first laser pulse is fired into a body of water to form an underwater optical filament coinciding with a low-energy plasma. A second laser pulse is fired into the water, targeted at the plasma. The second pulse heats the plasma, causing the formation of an extended superheated plasma volume in the water. The two laser pulses can be simultaneous or can be sequential, with the second pulse following the first pulse by up to the filament plasma lifetime. The extended superheated plasma creates an underwater acoustic pulse, wherein the duration, waveform and directivity of the pulse can be tailored by controlling the shape of the underwater laser-generated plasma.

20 Claims, 4 Drawing Sheets

(56) References Cited

OTHER PUBLICATIONS

Y.E. Krasik, A. Grinenko, A. Sayapin, S. Efimov, A. Fedotov, V.Z. Gurovich, and V.I. Oreshkin, "Underwater Electrical Wire Explosion and Its Applications," IEEE Transactions on Plasma Science 36, 423 (2008).

J.R. Woodworth, I. Molina, D. Nelson, J. Maenchen, G. Sarkisov, J. Blickem, R. Starbird, F. Wilkins, D. Van Devalde, and D.L. Johnson, "Green-Laser-Triggered Water Switching at 1.6 MV," IEEE Trans. on Dielectrics and Insulation 14, 951 (2007).

W. Liu, O. Kosareva, I.S. Golubtsov, A. Iwasaki, A. Becker, V.P. Kandidov, S.L. Chin, "Femtosecond laser pulse filamentation vs. optical breakdown in H2O," Appl. Phys. B 76, 215 (2003).

* cited by examiner

FIG. 4A

TWO-LASER GENERATION OF EXTENDED UNDERWATER PLASMA

CROSS-REFERENCE

This application is a Nonprovisional of and claims the benefit of priority under 35 U.S.C. §119 based on U.S. Provisional Patent Application No. 61/469,818 filed on Dec. 13, 2011, the entirety of which is hereby incorporated by reference into the present application.

TECHNICAL FIELD

The present invention relates to laser generation of underwater shaped plasmas and bubbles, which may be used for remote underwater laser acoustic generation and micromachining.

BACKGROUND

An optical filament is a light beam which propagates at high intensity and small radius for long distances, beyond the Rayleigh length, $z_R$, the beam distance for normal diffraction-driven divergence. Herein, for laser pulses, we refer to the beam irradiance, defined as the pulse energy divided by the quantity (beam area×pulse duration), as the beam or pulse "intensity". Optical filaments generated by laser pulses have been observed in water.

The study of such underwater optical filaments, including determination of optimal generation parameters, maximum propagation length, and filament plasma lifetime, is a focus of ongoing research by scientists at the Naval Research Laboratory, including the inventors of the present invention. See Helle, et al., "Underwater Laser Filamentation and Guiding of Electrical Discharges," contributed talk at 2011 IEEE Conference on Plasma Science, Chicago, Ill. (2011).

It is believed that the diameter of such an optical filament in a given medium is a function of wavelength and pulse duration. For example, 70 femtosecond, 800 nm wavelength optical filaments in air have an observed diameter of 70 microns, see Y.-H. Chen, S. Varma, T. M. Antonsen, and H. M. Milchberg, "Direct Measurement of the Electron Density of Extended Femtosecond Laser Pulse-Induced Filaments," Phys. Rev. Lett. 105, 215005 (2010), while 5 nanosecond, 532 nm underwater optical filaments have an observed diameter of 100 microns, see M. Helle, T. G. Jones, J. Peñano and A. Ting, "Formation and propagation of meter-scale laser filaments in water," submitted to Opt. Lett., November 2012.

Both air and water are transparent to a range of wavelengths, enabling an intense laser beam to propagate many tens of meters. In addition, both media have nonlinear dielectric response with respect to the optical field intensity. For example, water exhibits a positive nonlinear index of refraction (Kerr effect) above a certain laser intensity threshold. In addition, water undergoes photoionization when subjected to a laser pulse above a separate ionization intensity threshold. See U.S. Pat. No. 7,260,023, "Remote Underwater Laser Acoustic Source," ("Jones '023") which has at least one inventor in common with the present invention and which is hereby incorporated by reference into the present disclosure in its entirety.

The threshold laser power needed to induce the Kerr effect is $$P_{NSF} = \frac{\lambda^2}{2\pi n_0 n_2},$$

where $\lambda$ is the laser wavelength, $n_0$ is the linear index of refraction, and $n_2$ is the nonlinear index of refraction, so that to lowest order in the laser intensity, $n=n_0+n_2 I$. For visible wavelengths in water, $P_{NSF}$ is of the order of 1 megawatt (MW). See '023 patent, supra.

The threshold irradiance needed to cause underwater photoionization is pulse length dependent, and ranges from approximately $10^{10}$ Watts per square centimeter (W/cm$^2$) for ns pulses to more than $10^{13}$ W/cm$^2$ for femtosecond (fs) pulses. Id.

Although the mechanisms of underwater filament formation have not been definitively determined, a leading theory is that underwater optical filaments are analogous to filaments in air, and are formed as a result of Kerr-induced beam self-focusing balanced by ionization-induced beam defocusing and diffraction. The underwater filament so generated can propagate through the water for many Rayleigh lengths.

According to the leading theory, these underwater optical filaments have an extended low energy plasma associated therewith. When the optical filament plasma is heated by another laser pulse in accordance with the present invention, an extended energetic underwater plasma can form which is useful for generating underwater vapor channels and guiding longer range underwater electrical discharges. See U.S. Pat. No. 8,941,967 B2 entitled "Underwater Laser-Guided Discharge," ("Jones '967") which has at least one inventor in common with the present invention and which is hereby incorporated into the present disclosure in its entirety. Such discharges could enable a new class of undersea weapon, or could be useful for micromachining, potentially combining desirable features of underwater femtosecond laser machining and underwater electric discharge machining.

An especially important potential application of extended underwater plasmas for the Navy is the generation of shaped energetic underwater plasmas suitable for long-duration underwater acoustic pulse generation. Longer duration acoustic pulses suffer less ultrasonic attenuation, and thus have much greater acoustic range, making them useful for applications like long range sonar and long range acoustic communications.

However, there is presently no technique to remotely generate a spatially extended underwater plasma. One currently available technology for generating extended underwater plasmas, available from Applied Acoustic Engineering Ltd, Marine House, Marine Park, Gapton Hall Rd, Great Yarmouth NR31 0NB, U.K., employs underwater spark gaps, known as "sparkers" when used for acoustic generation. Another currently available technology employs underwater wire discharges, see Y. E. Krasik, A. Grinenko, A. Sayapin, S. Efimov, A. Fedotov, V. Z. Gurovich, and V. I. Oreshkin, "Underwater Electrical Wire Explosion and Its Applications," IEEE Transactions on Plasma Science 36, 423 (2008). However, both underwater spark gaps and underwater wire discharges require hardware in the water, and therefore cannot generate acoustic signals remotely. Furthermore, an underwater wire discharge is a single-shot device; because the wire is vaporized during each pulse, repeated wire replacement is required for multiple-shot operation.

Single laser pulse techniques for remotely generating energetic underwater plasmas have been developed at NRL, see Jones '023, supra; see also T. G. Jones, et al., "Intense Underwater Laser Acoustic Source for Navy Applications," Invited talk at 157th Meeting of Acoustical Society of America, Portland, Oreg., May, 2009. However, the plasmas generated by such techniques have only reached lengths of about 5 cm and so are not suitable for generation of long-duration underwater acoustic pulses or for guiding long-range underwater electrical discharges.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a method for remotely generating a spatially extended plasma in a body of water using two laser pulses fired into the water.

In accordance with the present invention, a first laser pulse is fired into the water, the first pulse being focused to a high intensity sufficient to form an optical filament. After its formation, the optical filament propagates for many Rayleigh lengths.

The filament coincides with a low-energy plasma which serves as a target for efficient heating by a second high-energy laser pulse. Thus, in accordance with the present invention, a second laser pulse is also fired into the water, with the second pulse being targeted at the filament plasma. The second laser pulse need not be as intense as the first pulse, but is focused to uniformly deposit maximum energy into the plasma. After recombination and thermalization, superheated water remains in the volume that originally contained the heated plasma.

The spatially extended superheated water volume generates an acoustic pulse with controllable anisotropic pulse duration. Acoustic pulses with longer duration have lower frequency content and therefore lower attenuation during propagation, and in turn travel greater distances in the water than short duration acoustic pulses. The waveform and duration of the acoustic pulse can be tailored by varying the characteristics of one or both of the laser pulses.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

As noted above, although spatially extended underwater plasmas have many desirable features and applications, there is presently no technique to remotely generate an extended underwater plasma.

As described in more detail below, the present invention solves this problem by providing a method for remotely generating a spatially extended underwater plasma using two laser pulses fired into the water.

In accordance with the present invention, a first laser pulse, sometimes referred to herein as a "filamentation pulse," is fired into the water, the first pulse being focused to a high intensity sufficient to form an optical filament in the water.

In many cases the first pulse will have an intensity sufficient to cause Kerr-induced self-focusing of the beam which, balanced by ionization-induced beam defocusing and diffraction, causes the optical filament to form. See Jones '023 and Jones '967, supra for a more detailed discussion of Kerr-induced self-focusing, ionization, and filament formation. However, it may be possible that a filament may be formed using a focused laser pulse having an intensity other than one that produces Kerr-induced self-focusing, and such embodiments are also contemplated to be within the scope of the present invention.

Beam focusing can be accomplished using an optic such as a spherical lens or an off-axis parabolic mirror, in which case filament formation will occur near or in front of the focal plane of the optic. Alternatively, a collimated beam above the threshold power for inducing the nonlinear Kerr effect can self-focus, although this focusing method inherently has less controllability and reproducibility of the focal plane location than focusing with an optic.

Irrespective of the specific mechanisms involved, the optical filament formed by the first laser pulse propagates for many Rayleigh lengths through the water, where the Rayleigh length, $z_R = \pi \times w^2/\lambda$, is the distance over which a collimated beam would double in area due to diffraction-driven divergence.

The optical filament formed in the water coincides with a low-energy plasma which serves as a target for efficient heating by a second high-energy laser pulse. Thus, in accordance with the present invention, a second laser pulse is also fired into the water, targeted at the filament plasma. The second laser pulse, sometimes referred to herein as a "heating pulse," need not be as intense as the first pulse, but is configured to uniformly deposit maximum energy into the plasma. After recombination and thermalization, superheated water remains in the volume originally containing heated plasma.

As described in more detail below, the filamentation pulse and the heating pulse can be generated by the same laser source or different sources, which can be airborne, ship-mounted, or underwater, and can be placed on both manned and unmanned craft.

Figure 1:
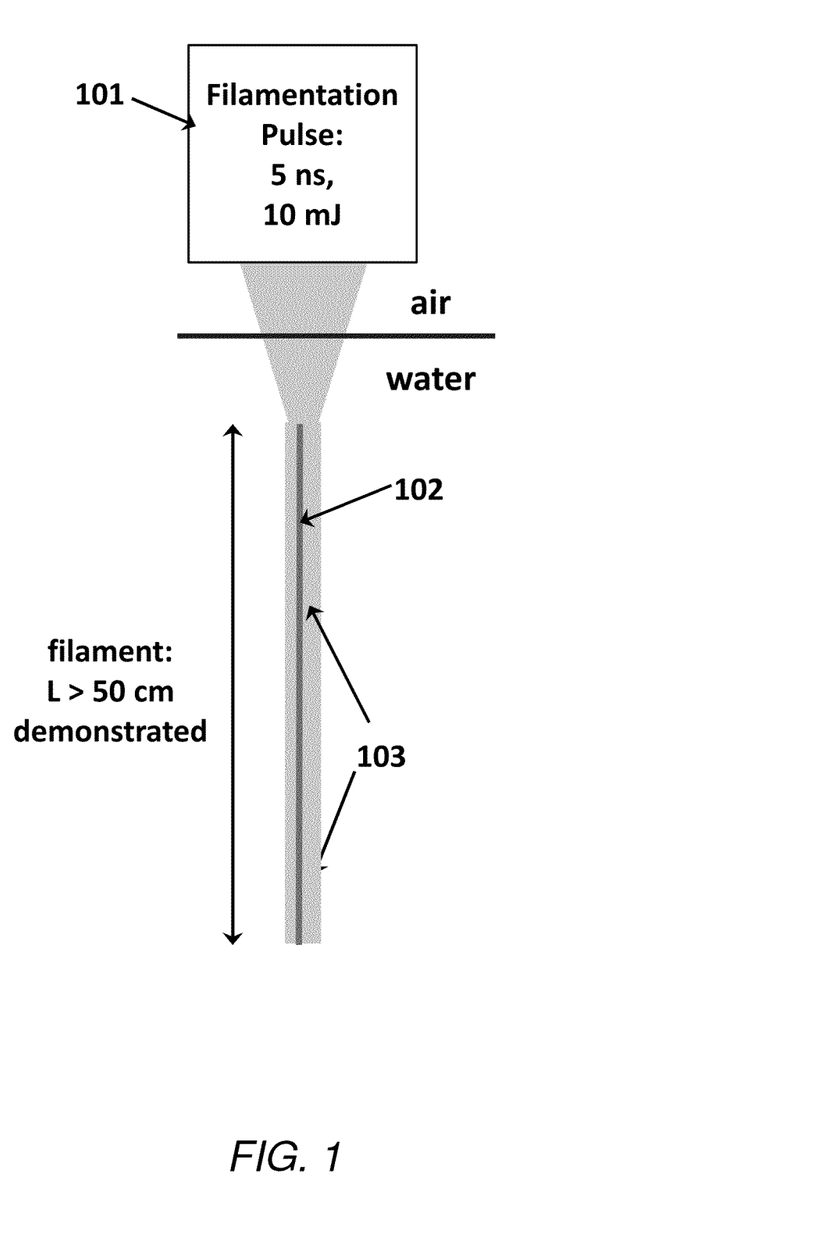
FIG. 1 is a block diagram illustrating formation of an underwater optical filament by an intense laser pulse in accordance with one or more aspects of the present invention. Laser pulse parameters are for example only.

FIG. 1 illustrates aspects of formation of an optical filament in water using a first laser pulse in accordance with the present invention. Thus, as shown in FIG. 1, a first laser pulse 101 generates an underwater optical filament 103 coinciding with a plasma 102 that propagates for many Rayleigh lengths. The high intensity needed for the first laser pulse to generate the filament can be obtained by focusing the pulse. Thus, in accordance with the present invention, the filamentation pulse is fired into the water, focused at a large f/# to a high intensity sufficient to form an optical filament. As noted above, such beam focusing can be accomplished using an optic such as a spherical lens or an off-axis parabolic mirror. Alternatively, a collimated beam having power above $P_{NSF}$, the threshold for inducing the nonlinear Kerr-effect can self-focus to produce the filament. The filament forms near or in front of the focal plane of the optic used, depending on laser intensity and the strength of Ken-induced nonlinear self-focusing, and then propagates for many Rayleigh lengths.

Optimal single filament reproducibility and propagation distance were obtained by focusing with an f/# (focal length divided by initial beam diameter) configured to produce a spot size matching the observed diameter of the filament in the water, where the focal spot is limited by diffraction to a radius $w=k\lambda \times f/\#$ (with $k=2/\pi$ for a Gaussian beam), and by using laser power of approximately $5 \times P_{NSF}$.

In the exemplary case illustrated in FIG. 1, the laser pulse is configured to take advantage of the Kerr effect in the water to generate the optical filament and maintain an ionizing optical intensity over a propagation volume of extended length. Thus, in the exemplary case illustrated in FIG. 1, laser pulse 101 has a duration of 5 ns and an energy of 10 mJ, and generates a filament 103 having a length greater than 50 cm. For a 5 ns pulse at 532 nm, the observed underwater filament diameter is 100 microns, so the beam should optimally be focused to produce a diffraction-limited spot size having this diameter. For these laser parameters, such focusing can be accomplished using an f/# of 310, while different laser parameters may produce different filament diameters, and therefore might require focusing at different f/#s. In other cases, pulses having different wavelengths, intensities, or duration may be used, with the resulting optical filaments having greater or lesser lengths depending on the pulse characteristics. For example, a laser beam of diameter 100 μm would normally diffract to twice its initial area over a distance of order of the Rayleigh length, $z_R = \pi \times w^2/\lambda$. For these parameters, $z_R = 1.5$ cm, so that an observed 55 cm filament length represents nonlinear intense laser propagation more than 30 times farther than would be expected based solely on linear propagation with diffraction-driven beam divergence.

Figure 2:
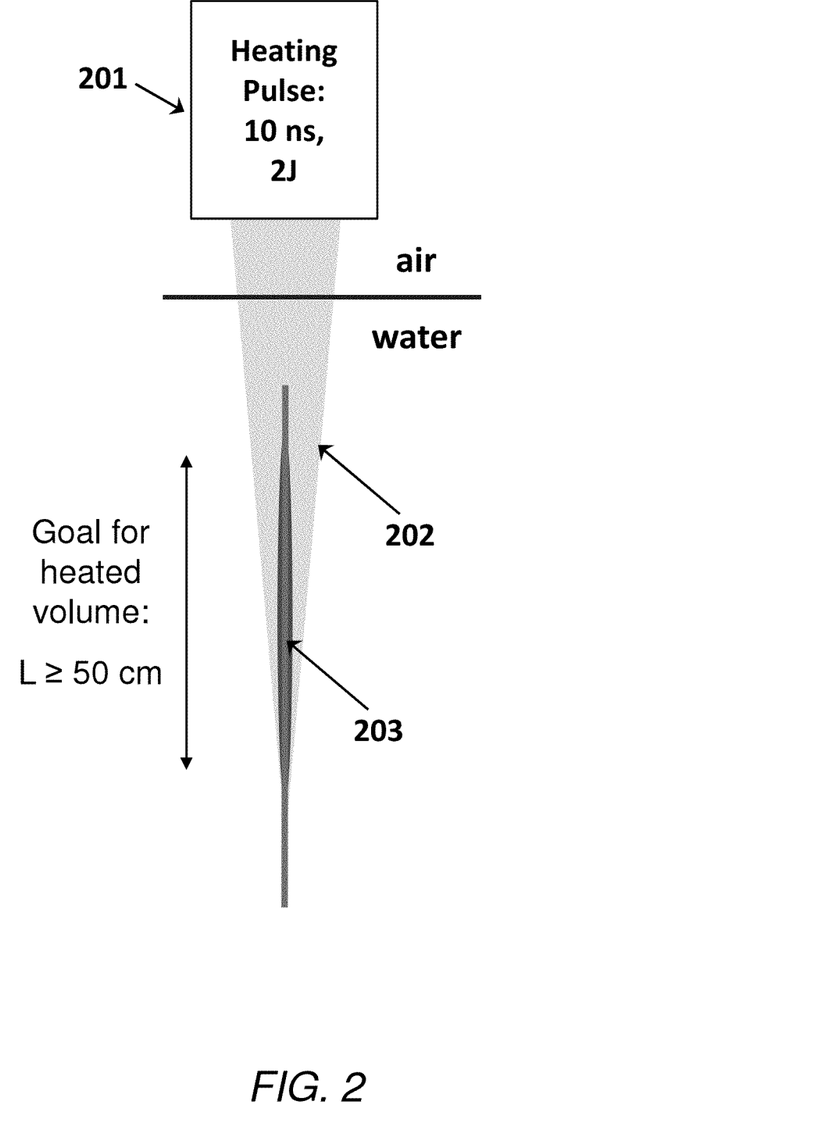
FIG. 2 is a block diagram illustrating heating of an extended underwater optical filament plasma by a second intense laser pulse, in accordance with one or more aspects of the present invention. Laser pulse parameters are for example only.

As illustrated in FIG. 2, in accordance with the present invention, a second high-energy laser pulse, sometimes referred to herein as a "heating pulse," is also fired into the water. In the exemplary case illustrated in FIG. 2, this second pulse has a duration of about 10 ns and an energy of about 2 J, though pulses having different durations and/or intensities may also be used as appropriate. In some embodiments the filamentation and heating pulses are simultaneous, while in other embodiments they are sequential, with the heating pulse following the filamentation pulse in time by up to the lifetime of the filament plasma. Unlike filamentation pulse 101, heating pulse 202 need not reach the intensity required for photoionization, but instead is configured to uniformly deposit maximum energy into the filament plasma to form a superheated volume 203.

The heating pulse is focused differently from the filamentation pulse. While the filamentation pulse is focused to achieve the formation of an optical filament in the water, the heating pulse is focused to achieve optimal energy coupling between it and the plasma. Various lens focusing configurations can be used with the heating pulse to achieve this energy coupling. For example, an axicon lens, which has a conical shape and generates a line focus, is well suited for this task, and axicon-focused underwater laser beams have been successfully used to generate underwater vapor channels for triggering pulsed power water switches. See J. R. Woodworth, I. Molina, D. Nelson, J. Maenchen, G. Sarkisov, J. Blickem, R. Starbird, F. Wilkins, D. Van DeValde, and D. L. Johnson, "Green-Laser-Triggered Water Switching at 1.6 MV," *IEEE Trans. on Dielectrics and Insulation* 14, 951 (2007). Other alternatives to achieve optimal energy coupling between the pulse and the plasma include a spherical lens focusing with very large f/#, or a cylindrical lens focusing from the side of the filament. The first two options are depicted schematically in the embodiment illustrated in FIG. 2, where the heating pulse is fired so as to have its optical axis coaxial with the filament. Regardless of the focusing geometry, the heating pulse must be well aligned with the exceedingly narrow optical filament plasma, and both laser pulses must maintain tight tolerances on pointing accuracy and stability.

In some embodiments, the two pulses are generated by different lasers, with such a configuration allowing complete freedom of choice of pulse parameters for each task. On the other hand, a single laser can also be used to generate both pulses, which may be advantageous for compactness, portability, and energy efficiency. In the single-laser embodiment, the laser platform can include a beam splitter, separate focusing optics for each of the filamentation and heating pulses, and beam recombination optics to steer both pulses onto a single beam axis. An optical delay stage for one of the pulses can enable control of the relative timing of the two pulses. The single-laser embodiment has the additional advantage of high alignment stability between filamentation and heating pulses since the laser source is the same for both. Finally, one or both of the laser platform or platforms may be airborne, ship-mounted, or underwater (with windows allowing beam exit from the platform), as best fulfills application requirements.

It should be noted that a bifurcation of underwater laser propagation behavior has been observed, in which focusing with an f/# below a critical value (short focal lengths and sharp focal angles) tends to produce an axially-localized, dense plasma, and does not generate an optical filament, while focusing with an f/# larger than this critical value (longer focal lengths and more shallow focal angles) does generate an optical filament. See W. Liu, O. Kosareva, I. S. Golubtsov, A. Iwasaki, A. Becker, V. P. Kandidov, S. L. Chin, "Femtosecond laser pulse filamentation vs. optical breakdown in $H_2O$," *Appl. Phys. B* 76, 215 (2003).

In addition, underwater laser pulses with power much greater than $P_{NSF}$, the threshold power needed to induce Kerr self-focusing, are subject to filamentation instability, resulting in multiple optical filaments. This would result in the heating pulse energy being divided among several filaments, each generating lower intensity acoustic pulses, which is an undesirable result. As noted above, $$P_{NSF} = \frac{\lambda^2}{2\pi n_0 n_2},$$

where λ is the laser wavelength, $n_0$ is the linear index of refraction, and $n_2$ is the nonlinear index of refraction so that to lowest order in the laser intensity, $n=n_0+n_2 I$, and therefore, there is an optimal power and energy range for single filament generation.

For example, in NRL experiments with laser pulses having a wavelength of 532 nm, a duration of 6 ns, an f/#=310, and $P_{Laser}=5\times P_{NSF}$ produced the optimal single filaments. In these experiments, the total laser pulse energy measured to be propagating within the filament through any plane is of the order of 1 millijoule (mJ). The energy density of this filament was neither sufficient to generate a single intense acoustic pulse, nor to create a vapor channel useful for guiding an electric discharge.

Figure 3:
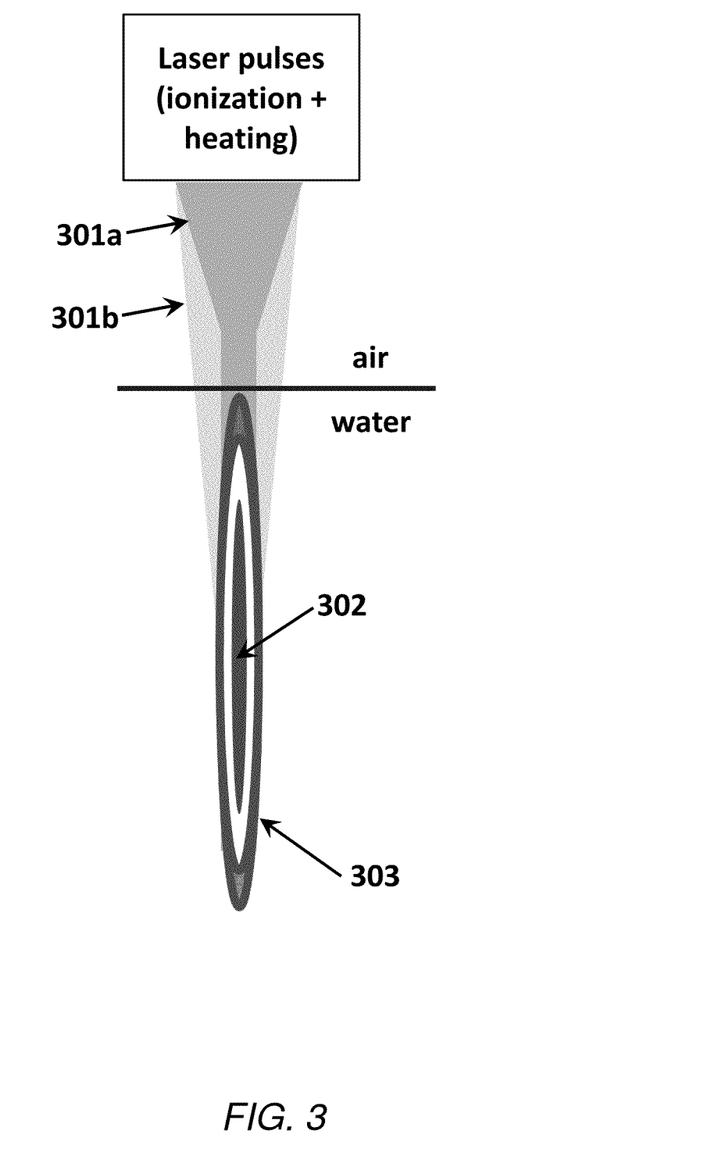
FIG. 3 is a block diagram illustrating generation of an acoustic pulse with anisotropic duration by a superheated underwater volume generated by two laser pulses in accordance with one or more aspects of the present invention.

The generation of an energetic spatially extended underwater plasma in accordance with the present invention naturally generates an underwater acoustic pulse having a controlled anisotropic waveform and pulse duration. As developed by NRL scientists and as described in the '023 patent, supra, a laser pulse fired into the water can generate an acoustic pulse in the water through a combination of lens- and Kerr-induced transverse focusing and group velocity dispersion-induced longitudinal pulse compression, resulting in ionization of a liquid volume and formation of an underwater plasma. As also described in the '023 patent, the waveform of the acoustic pulse is controlled by the shape of the underwater laser-generated plasma, and thus the shape of the pulse can be tailored by controlling the shape of the plasma. See also Jones, et al., "Characterization of Underwater Laser Acoustic Source for Navy Applications," contributed talk at 2009 IEEE Conference on Plasma Science, San Diego, Calif. (2009). The two-laser pulse technique of the present invention enables the generation of much longer energetic plasmas, of order 1 meter in length or longer, than those generated with a single pulse as described in the '023 patent, which have length up to order 5 cm. Thus the range of achievable acoustic pulse duration and the corresponding frequency range of laser-generated acoustic pulses are greatly extended by the present invention. FIG. 3 illustrates aspects of such acoustic pulse formation and waveform control. As illustrated in FIG. 3 and as described above with respect to FIGS. 1 and 2, energy from the laser pulses 301a (filamentation pulse) and 301b (heating pulse) fired into the water forms a superheated volume 302 which expands to generate an acoustic pulse 303 in a manner described in detail in the '023 patent, supra.

The acoustic pulse duration $\tau_{ac}$ in any direction of acoustic propagation is approximately the transverse plasma dimension d in that direction divided by the initial shock propagation speed $\vec{V}_{shock}$ i.e., $$\tau_{ac} \approx \frac{d}{|\vec{V}_{shock}|}.$$

Therefore $\tau_{ac} \sim E^{1/3}$ for a spherical plasma, and in such case simply increasing laser energy is an inefficient means to increase the pulse duration.

However, even though $\vec{V}_{shock}$ is similar in all directions, more elongated plasmas produce acoustic pulses that have anisotropic pulse duration, with the pulse duration in the direction parallel to that of the laser beam axis being longer than the pulse duration in other directions.

Figure 4A:
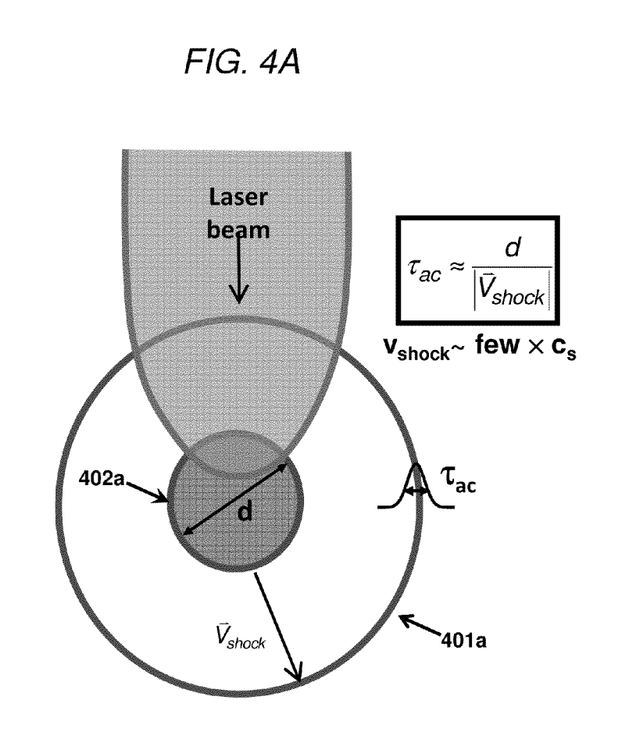
FIGS. 4A-4B are block diagrams illustrating aspects of formation of a laser-acoustic pulse, with FIG. 4A illustrating aspects of formation of a laser-acoustic pulse from an essentially spherical plasma generated by a single laser pulse and FIG. 4B illustrating aspects of formation of a laser-acoustic pulse from an elongated plasma generated by two laser pulses in accordance with one or more aspects of the present invention.
Figure 4B:
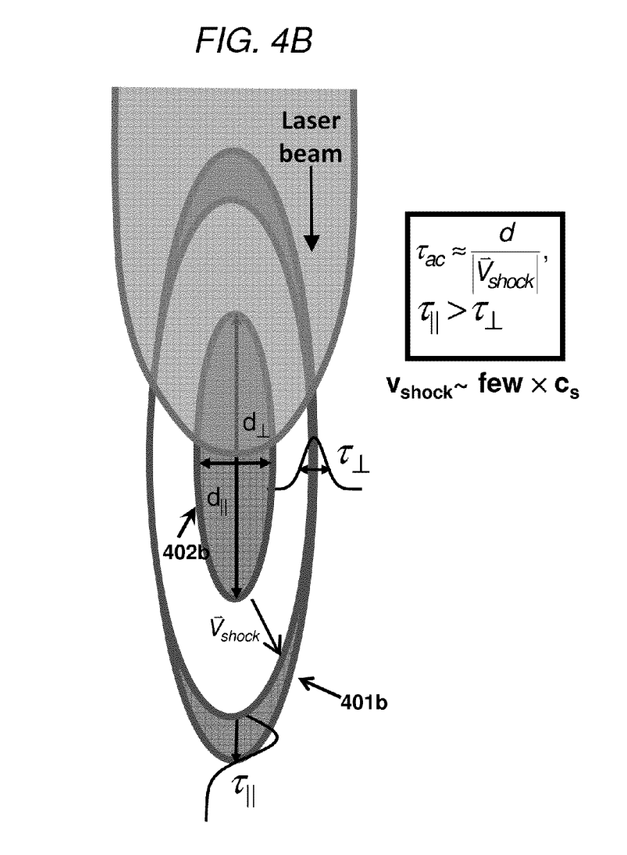

FIGS. 4A and 4B provide further illustration of this aspect of laser-acoustic pulse generation. FIG. 4A is a block drawing depicting an exemplary laser-acoustic pulse 401a generated by a spherically shaped superheated plasma 402a having a transverse dimension d in all directions, while FIG. 4B is a block drawing depicting an exemplary laser-acoustic pulse 401b generated by an elongated superheated plasma 402b having a transverse dimension $d_\perp$ in a direction normal to the direction of the laser beam axis forming the plasma and $d_\parallel$ in a direction parallel to the direction of the beam. The shape of the plasma in FIG. 4B creates an acoustic pulse with anisotropic pulse duration, and thereby enables control of the acoustic waveform and directivity. As can be seen from FIGS. 4A and 4B, acoustic pulse 401a has a duration $$\tau_{ac} \approx \frac{d}{|\vec{V}_{shock}|},$$

and because d is uniform in all directions, so is $\tau_{ac}$. In contrast, because $d_\parallel$ in the elongated plasma 402b is greater than $d_\perp$, the temporal duration $\tau_\parallel$ of acoustic pulse 401b in a direction parallel to the laser pulse is longer than its duration $\tau_\perp$ in the direction normal to the laser pulse direction, and in fact is longer than its duration in any other direction.

This is a highly desirable result. Longer duration acoustic pulses suffer less ultrasonic attenuation, and thus have much greater acoustic range, making them useful for applications like long range sonar and acoustic communications.

Thus, the method of the present invention enables the remote generation of a high energy, spatially extended underwater plasma and a resulting superheated spatially extended volume of water. These can be used for generating underwater vapor channels and guiding longer range underwater electrical discharges, enabling the development of a new class of undersea weapon, development of micromachining techniques potentially combining features of underwater femtosecond laser machining and underwater electric discharge machining, and enabling the generation of long-duration acoustic pulses.

Although particular embodiments, aspects, and features have been described and illustrated, it should be noted that the invention described herein is not limited to only those embodiments, aspects, and features, and it should be readily appreciated that modifications may be made by persons skilled in the art. The present application contemplates any and all modifications within the spirit and scope of the underlying invention described and claimed herein, and all such embodiments are within the scope and spirit of the present disclosure.

What is claimed is:

1. A method for remotely generating a controlled extended underwater plasma having a desired spatial profile, comprising:
   at time t1, firing a first laser pulse into a body of water, the first laser pulse being focused to a first intensity and being configured to generate an optical filament in the water, the intensity of the first laser pulse further being configured to generate a low-energy plasma coincident with the optical filament; and
   at time t2, firing a second laser pulse into the body of water, targeted at the low-energy plasma coincident with the optical filament, the second laser pulse being focused to a second intensity and being configured to deposit its energy into the low-energy plasma so as to achieve desired heating of the low-energy plasma, causing formation of an extended plasma having a desired spatial profile and energy density.

2. The method according to claim 1, wherein the first intensity of the first laser pulse is produced by focusing the first laser pulse with a beam-focusing optic.

3. The method according to claim 1, wherein the intensity of the first laser pulse is sufficient to cause Ken-induced self-focusing of a first laser beam formed by the first laser pulse, wherein the Ken-induced self-focusing, balanced by diffraction and ionization-induced defocusing of the first laser beam, produces the optical filament.

4. The method according to claim 1, wherein the first laser pulse is collimated and the intensity of the first laser pulse is sufficiently high to cause Kerr-induced self-focusing in a collimated laser beam formed by the collimated laser pulse; wherein the Kerr-induced self-focusing of the collimated laser beam produces the optical filament.

5. The method according to claim 1, wherein the first laser pulse has a power $P_{laser} > P_{NSF}$, wherein $$P_{NSF} = \frac{\lambda^2}{2\pi n_0 n_2},$$

where $\lambda$ is the laser wavelength, $n_0$ is the water's linear index of refraction, and $n_2$ is the water's nonlinear index of refraction.

6. The method according to claim 3, wherein the first laser pulse has a power of about $5 \times P_{NSF}$ and is configured to produce a spot size matching an observed underwater filament diameter of 100 microns, the spot size being limited by diffraction to a radius $w = k\lambda \times f/\#$ (with $k = 2/\pi$ for a Gaussian beam).

7. The method according to claim 1, wherein the first laser pulse has a duration of 5 ns and an energy of 10 mJ and generates a filament having a length greater than 50 cm.

8. The method according to claim 1, wherein the second pulse has a duration of about 10 ns and an energy of about 2 J.

9. The method according to claim 1, wherein the intensity of the second laser pulse is produced by focusing the second laser pulse with an axicon lens.

10. The method according to claim 1, wherein the intensity of the second laser pulse produced by focusing the second laser pulse with a spherical lens focusing at large f/#.

11. The method according to claim 1, wherein the intensity of the second laser pulse is produced by focusing the second laser pulse with a cylindrical lens focused from a side of the filament.

12. The method according to claim 1, wherein t1=t2 such that the first and second laser pulses are fired simultaneously into the water.

13. The method according to claim 1, wherein t2>t2 such that the second laser pulse is fired into the water after the generation of the underwater filament by the first laser pulse.

14. The method according to claim 1, wherein a single laser source generates both the first and second pulses.

15. The method according to claim 14, wherein the single laser source includes a beam splitter, separate focusing optics for each of the first and second laser pulses, and beam recombination optics configured to steer the first and the second laser pulses onto a single beam axis.

16. A method for remotely generating an underwater acoustic pulse having a controlled anisotropic waveform and pulse duration, comprising:
   at time t1, firing a first laser pulse into a body of water, the first laser pulse being focused to a first intensity and being configured to generate an optical filament in the water, the intensity of the first laser pulse further being configured to generate a low-energy plasma coincident with the optical filament; and
   at time t2, firing a second laser pulse into the body of water targeted at the low-energy plasma coincident with the optical filament, the second laser pulse being focused to a second intensity and being configured to deposit its energy into the low-energy plasma so as to achieve a desired heating of the low-energy plasma, causing formation of an superheated extended underwater plasma having a desired spatial profile and energy density;
   wherein the extended underwater plasma generates an underwater acoustic pulse having a first desired pulse duration $\tau_\parallel$ in a direction parallel to the optical filament a second desired pulse duration $\tau_\perp$ in a direction orthogonal to the optical filament.

17. The method according to claim 16, wherein t1=t2 such that the first and second laser pulses are fired simultaneously into the water.

18. The method according to claim 16, wherein t2>t1 such that the second laser pulse is fired into the water after the generation of the underwater filament by the first laser pulse.

19. The method according to claim 16, wherein a single laser source generates both the first and second pulses.

20. The method according to claim 19, wherein the single laser source includes a beam splitter, separate focusing optics for each of the first and second laser pulses, and beam recombination optics configured to steer the first and the second laser pulses onto a single beam axis.

* * * * *